United States Patent
Singh et al.

(10) Patent No.: US 11,263,821 B1
(45) Date of Patent: Mar. 1, 2022

(54) GENERATING AUGMENTED REALITY PRERENDERINGS USING TEMPLATE IMAGES

(71) Applicant: Google LLC, Mountain View, CA (US)

(72) Inventors: James Sraw Singh, New York, NY (US); Ivan Neulander, Los Angeles, CA (US); Subramanian Shyamsunder Mathur, New York, NY (US); Agustin III Olivan Venezuela, Queens, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/153,263

(22) Filed: Jan. 20, 2021

(51) Int. Cl.
| | |
|---|---|
| *G06T 19/00* | (2011.01) |
| *G06T 11/60* | (2006.01) |
| *G06T 17/00* | (2006.01) |
| *G06F 16/953* | (2019.01) |

(52) U.S. Cl.
CPC .......... *G06T 19/006* (2013.01); *G06F 16/953* (2019.01); *G06T 11/60* (2013.01); *G06T 17/00* (2013.01)

(58) Field of Classification Search
CPC ......... G06T 11/00; G06T 11/60; G06T 15/00; G06T 17/00; G06T 19/00; G06T 19/003; G06T 19/006; G06F 3/011; G06F 3/013; G06F 3/0346; G06F 16/953
USPC ....................................................... 345/633
See application file for complete search history.

(56) References Cited

U.S. PATENT DOCUMENTS

| | | | | |
|---|---|---|---|---|
| 10,665,037 | B1 * | 5/2020 | Brimhall | G06T 19/006 |
| 10,970,843 | B1 * | 4/2021 | Olsen | H04N 21/4316 |
| 2017/0132841 | A1 * | 5/2017 | Morrison | G06K 9/00671 |
| 2017/0132842 | A1 * | 5/2017 | Morrison | G06T 19/006 |
| 2019/0095436 | A1 * | 3/2019 | Martinazzi | G06T 11/60 |
| 2019/0206141 | A1 * | 7/2019 | Deng | G06K 9/00671 |
| 2019/0378341 | A1 * | 12/2019 | Xie | G06T 19/006 |
| 2019/0379671 | A1 * | 12/2019 | Sundar | H04L 63/102 |
| 2020/0120308 | A1 * | 4/2020 | McMillan | H04N 7/142 |
| 2020/0151509 | A1 * | 5/2020 | Sunkavalli | G06K 9/6262 |
| 2020/0368616 | A1 * | 11/2020 | Delamont | A63F 13/25 |
| 2020/0394010 | A1 * | 12/2020 | Cooper | G09G 5/36 |
| 2021/0173474 | A1 * | 6/2021 | Sztuk | G06T 19/006 |

OTHER PUBLICATIONS

Modiface, Home Page, Web page https://modiface.com/, 8 Pages, Jan. 3, 2021, retrieved from Internet Archive Wayback Machine <https://web.archive.org/web/20210103051511/https:/modiface.com/ on Sep. 29, 2021>, 8 Pages.
Perfect, "Perfect Business," Web page <https://www.perfectcorp.com/business>, Date Available: Feb. 2020 to Oct. 2021, retrieved on Oct. 7, 2021, 5 Pages.

* cited by examiner

*Primary Examiner* — David T Welch
(74) *Attorney, Agent, or Firm* — Dority & Manning, P.A.

(57) ABSTRACT

Systems and methods for generating augmented reality prerenderings can provide the benefit of an augmented reality rendering without requiring the use of user data. Template images can be used instead of user data to protect the user's privacy while enabling the user to see an object or product rendered onto a preferred template image or a variety of template images.

19 Claims, 11 Drawing Sheets

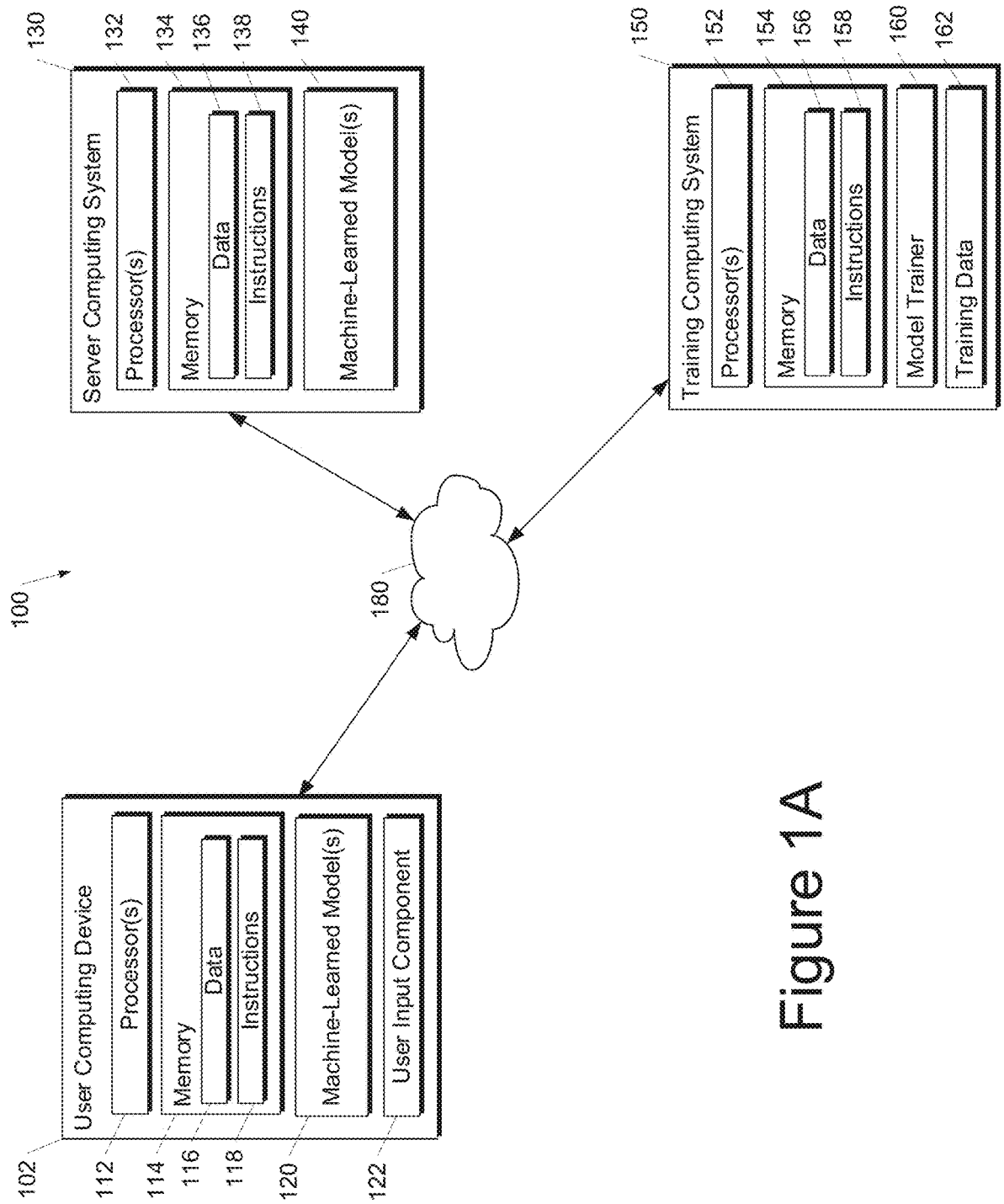

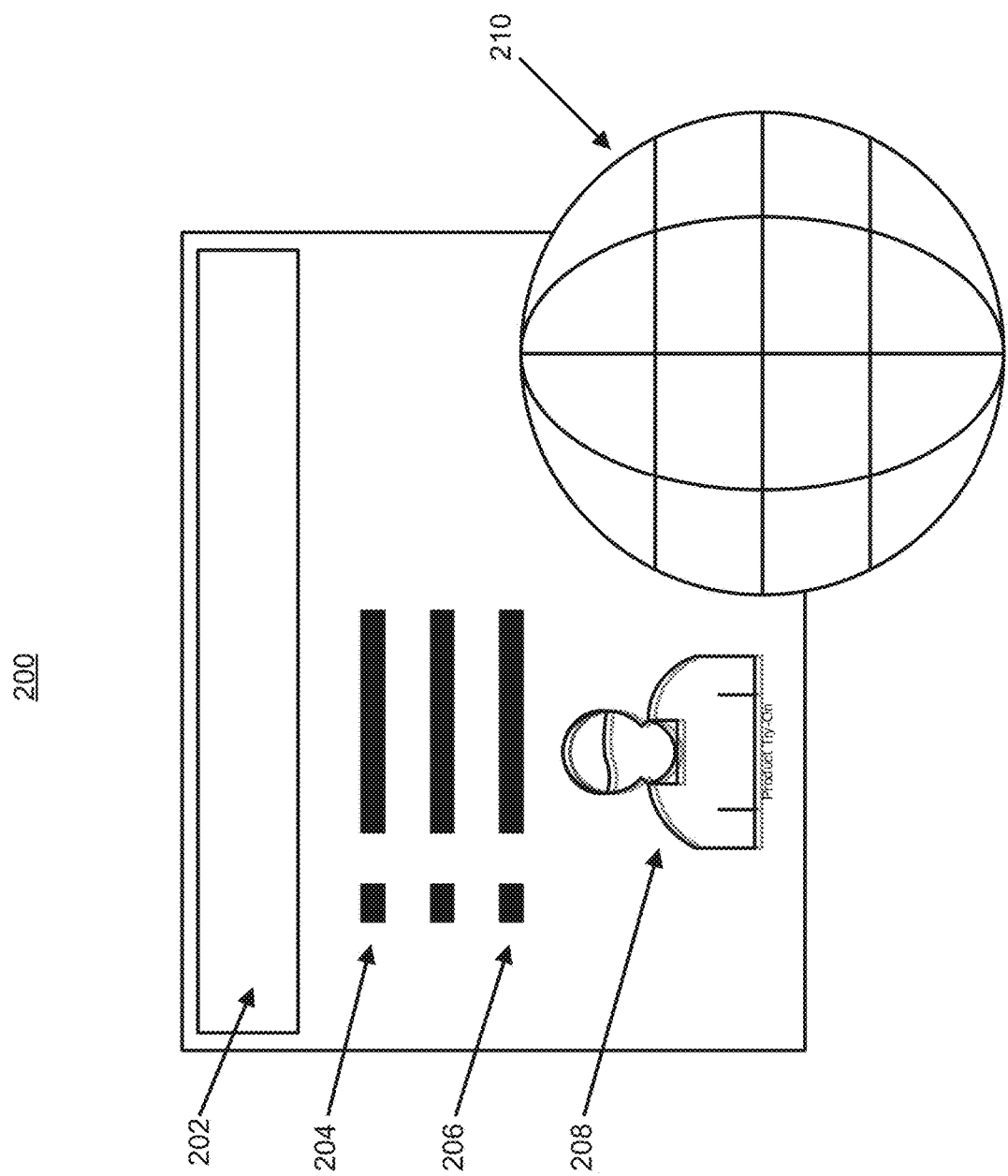

GENERATING AUGMENTED REALITY PRERENDERINGS USING TEMPLATE IMAGES

FIELD

The present disclosure relates generally to prerendering images. More particularly, the present disclosure relates to prerendering augmented reality images from a set of template images, for example, to enable a limited augmented reality experience from a template image as an alternative to a real-time, personalized augmented reality experience.

BACKGROUND

Augmented reality (AR) can refer to the creating and execution of interactive experiences of a real-world environment where the objects that reside in the real world are enhanced by computer-generated perceptual information. As one example, an AR experience can include augmenting a scene captured by a camera by inserting virtual objects into the scene and/or modifying the appearance of real world objects included in the scene.

When searching for products that have a strong aesthetic aspect, such as cosmetics, it is often not enough to see the product's packaging or even the product itself. To solve this problem, there have been efforts to digitize cosmetics and other products in augmented reality (AR) to allow consumers to visualize the product on themselves or in their personal surroundings. However, many users may not desire to use AR try-on due to natural frictions. For example, a user may not be in a location where using the camera is practical, the user may not feel they look their best and are reluctant to turn on the camera, and/or they simply may not want to grant camera permissions.

Moreover, live AR experiences can require a large amount of data bandwidth and processing power.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for providing prerendered augmented images. The method can include obtaining, by a computing device, a plurality of template images. The method can include processing, by the computing device, the plurality of template images with an augmented reality rendering model to generate a plurality prerendered images. In some implementations, the method can include receiving, by the computing device, a request for a result image and a preference. The method can include providing, by the computing device, a prerendered result based at least in part on the request and the preference. In some implementations, the prerendered result can be a prerendered image from the plurality of prerendered images.

Another example aspect of the present disclosure is directed to a computing system. The computer system can include one or more processors and one or more non-transitory computer readable media that collectively store instructions that, when executed by the one or more processors, cause the computing system to perform operations. The operations can include obtaining augmented reality assets. In some implementations, the augmented reality assets can include digitization parameters. The operations can include obtaining a plurality of template images. The operations can include processing the plurality of template images with an augmented reality model to generate a plurality of prerendered images based at least in part on the digitization parameters and storing the plurality of prerendered images.

Another example aspect of the present disclosure is directed to one or more non-transitory computer readable media that collectively store instructions that, when executed by one or more processors, cause a computing system to perform operations. The operations can include obtaining augmented reality assets. The augmented reality assets can include digitization parameters. In some implementations, the operations can include obtaining a plurality of template images. The operations can include processing the plurality of template images with an augmented reality model to generate a plurality of prerendered images based at least in part on the digitization parameters. The operations can include storing the plurality of prerendered images on a server and receiving a search query that can include one or more search terms. The one or more search terms can relate to a product. In some implementations, the operations can include providing a search result. The search result can include a prerendered image from the plurality of prerendered images retrieved from the server. The prerendered image can include a rendering of the product.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 1A depicts a block diagram of an example computing system that performs prerendering according to example embodiments of the present disclosure.

FIG. 2 depicts a block diagram of an example display of a prerendered image according to example embodiments of the present disclosure.

Figure 1B:
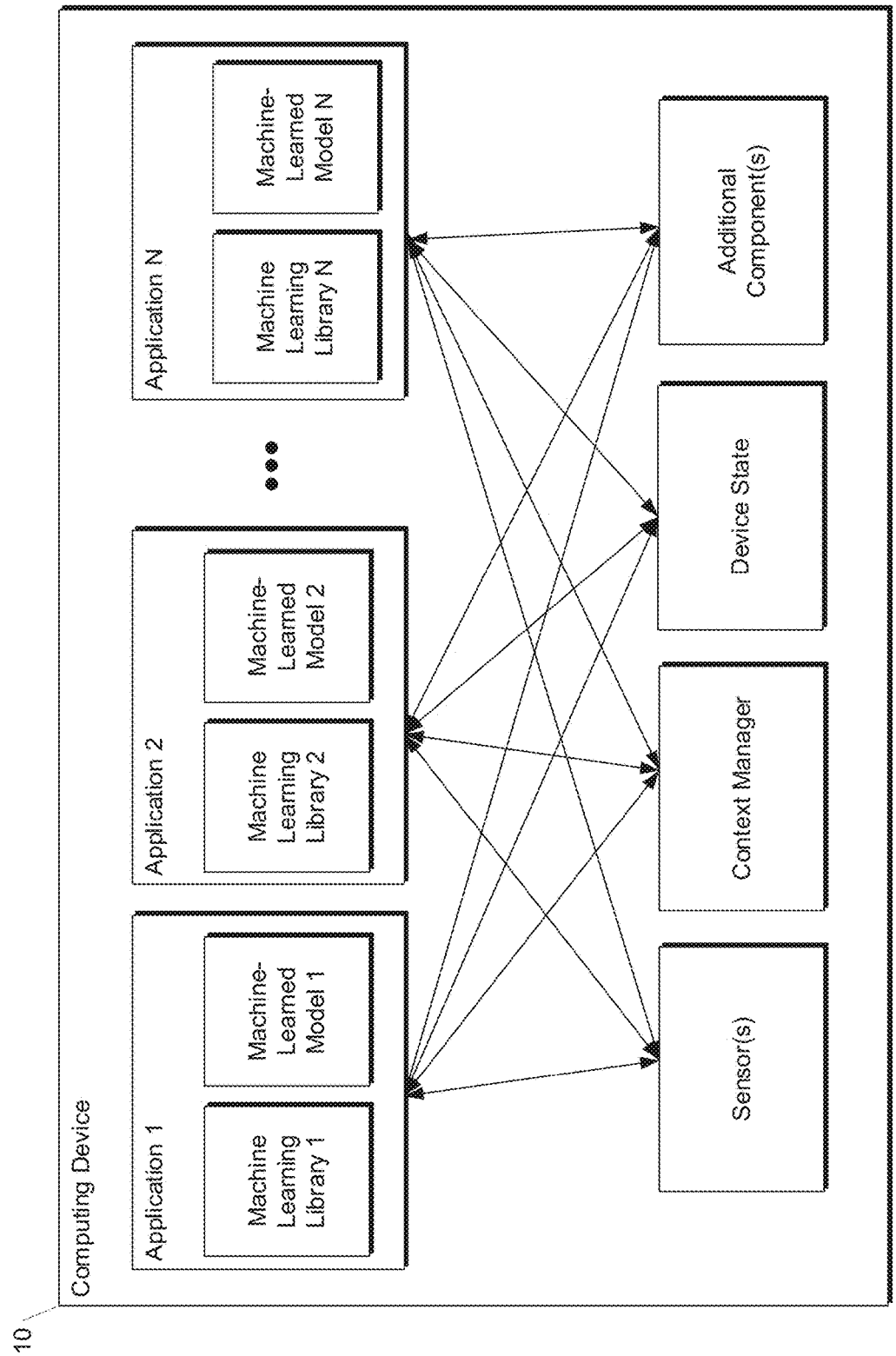
FIG. 1B depicts a block diagram of an example computing device that performs prerendering according to example embodiments of the present disclosure.

Reference numerals that are repeated across plural figures are intended to identify the same features in various implementations.

DETAILED DESCRIPTION

Overview

Generally, the present disclosure is directed to systems and methods for prerendering augmented reality template images, for example, to enable a limited augmented reality experience from a template image as an alternative to a real-time, personalized augmented reality experience that uses specific imagery of the user. In some implementations, the systems and methods can be implemented as a platform for generating prerendered augmented reality images from a set of template images. The system can include obtaining augmented reality assets and a set of template images. The template images may be a diverse set of images which show persons or settings having diverse characteristics or features, such as, for example, different eye colors or other visual characteristics. The set of template images can be processed by an augmentation model, or an augmented reality model, parameterized by the obtained augmented reality assets. The augmented reality model can output a set of prerendered images, and the prerendered images can be stored on a server. In some implementations, the system can receive a request for a result image along with user preferences. For example, the request can be a search query in the form of one or more search terms. The system may process the request and the preferences to determine a result image. The result image can be one or more of the prerendered images from the set of prerendered images. For example, the user can select (or have pre-selected) one or more preferences which can guide selection of one or more of the prerendered images as the result image. The result may be provided to the user. In such fashion, the user can be provided with one or more prerendered images which satisfy the user's preferences (e.g., prerendered images generated from templates which have characteristics that match the user's). Thus, in some cases, a user can see how the product would appear on a person or setting similar to their own, but without needing to be in a location where using the camera is practical and/or supply actual imagery of themselves or their surroundings. In some implementations, the system can also provide a link to a real-time augmented reality experience to the user, e.g., so that the user may still pursue the full, real-time AR experience if desired.

In some implementations, the prerendering of augmented reality images can be facilitated by a platform. The platform may be used to collect augmented reality data assets made using the platform, or alternatively, may collect augmented reality assets generated outside of the platform. The platform may collect augmented reality assets from third party companies that provide a product for sale (e.g., cosmetics (e.g., lipstick, eye shadow, etc.), furniture or other home goods (e.g., electronic equipment, cookware, glassware, decorations, plants, etc.), clothing, paint colors, automobiles, various electronics, etc.). Furthermore, the platform may use the collected augmented reality assets to render rendering effects into template images to generate prerendered images. The template images may be locally stored or obtained from outside the platform. The prerendered images may then be stored for later display to a user. For example, a user computing device can send a request for one or more prerendered images. The request can be a search query, a user selection, or an automated request reactionary to a user action. The platform can process the request along with the user's preferences to provide one or more prerendered images relating to the request and preferences.

The systems and methods can include obtaining a plurality of template images. The plurality of template images can be a set of images depicting a similar focal point but with variances (e.g., each of the template images depict a living room but each picture depicts a different color scheme to that room, where the furniture and décor have varying themes and colors). The systems and methods can process the plurality of template images with an augmented reality rendering model to generate a plurality prerendered images. In some implementations, the augmented reality rendering model can include object tracking and rendering. The plurality of prerendered images can be a set of augmented images, where each of the template images can be augmented to include an augmented reality rendering effect. The augmented reality rendering effect can be a product sold by a third party, where the consumer can virtually "try-on" the product in different template scenarios (e.g., a furniture item rendered into the template room images). In some implementations, the systems and methods can include receiving a request for a result image and a preference. The request can come from a user computing system, in which the user has indicated a want to see a prerendered image. In some implementations, the request can include search terms input into a search engine. The preference can include a selection made at time of request or previously stored which can indicate a preferred template type or preferred template. The systems and methods can then provide a prerendered result based at least in part on the request and the preference, in which the prerendered result can be a prerendered image from the plurality of prerendered images. In some implementations, the prerendered result can be a prerendered image matching the preference, in which the preference includes a template selected by a user from the plurality of template images. In some implementations, the systems and methods may provide a link to an augmented reality rendering experience for live try-on.

In some implementations, the systems and methods can obtain augmented reality assets that can be stored for use by the augmented reality model, or augmentation model. The augmented reality assets can include digitization parameters. The digitization parameters can enable the augmented reality model, or augmentation model, to render a particular rendering effect. In some implementations, the augmented reality assets can be used by the augmented reality model to process a set of template images to generate a set of prerendered images. The set of prerendered images can then be stored for later retrieval. In some implementations, the set of prerendered images may be stored on a server.

In some implementations, the set of template images can be processed by object-tracking computer vision algorithms and computer rendering operations to generate augmented reality prerendered images that simulate the appearance of products. The products may be applied to the depicted faces in the template images or otherwise inserted into the depicted images of the set of template images. The rendering operations can be affected by the CPU or GPU algorithms and corresponding parameters. The corresponding parameters can be parameters that realistically capture the appearance of the products inserted into the template images under the depicted lighting conditions.

In some implementations, the systems and methods can include receiving a search query including one or more search terms, in which the one or more search terms relate to a product. Furthermore, the systems and methods can include providing a search result. The search result can include a prerendered image from the plurality of prerendered images. Moreover, the prerendered image can include a rendering of the product.

In some implementations, the set of template images can be processed to generate a set of template models that can be processed by the augmented reality model, or an augmentation model. In some implementations, the template models can be modified before being processed. The systems and methods can receive an input to modify a template model of the plurality of template models. The systems and methods can modify the template model based at least in part on the input. In some implementations, the system and methods can include providing a template model of the plurality of template models for display.

In some implementations, the augmented reality model may include a perception subgraph and a rendering subgraph. The perception subgraph can be uniform throughout the system. The perception subgraph may be used with a variety of different rendering subgraphs. The rendering subgraph can be built by a third party to generate a rendering effect to provide to a user. The rendering subgraph may be built then used by the augmented reality prerendering platform that stores the perception subgraph. The rendering subgraph may vary depending on the rendering effect and the third party. In some implementations, a single perception subgraph can be used with multiple rendering subgraphs to render multiple renderings in an augmented image or video. For example, a picture or video of a face can be processed to generate an augmented reality rendering of lipstick, eyeshadow, and mascara on the face. The processing may include a singular perception subgraph but a rendering subgraph for each respective product (i.e., lipstick, eye shadow, and mascara).

The systems and methods disclosed herein can be applicable to a variety of augmented reality experiences (e.g., home goods, makeup, automotive (3D), eyeglasses, jewelry, clothing, and haircuts). For example, the systems and methods disclosed herein can be used to generate a set of prerendered images to provide renderings of products to consumers in various environments or applications. In some implementations, the template images can be various room images of varying set-ups, color schemes, and décor. The desired rendering effect may be a sofa. The system can intake the set of template images and the augmented reality assets related to the sofa and can generate a set of prerendered images to provide to a user. The prerendered images can include an augmented reality rendering of the desired sofa in each of the template images to allow the user to see how the sofa may look in a variety of room types with various color schemes, décor, and layout.

In some implementations, the plurality of template images can include a set of face images with diverse characteristics or features such as, for example, different eye colors or other visual characteristics, in which a consumer can select and/or store a preference template that may be most analogous to them. The rendering effect can be a make-up rendering (e.g., lipstick, eye shadow, mascara, foundation, etc.). The augmented reality model can process the augmented reality assets and the set of template images to generate prerendered make-up images, in which each of the plurality of template images can be augmented to include the make-up product. For example, a certain shade of lipstick may be rendered into each of the template images.

In some implementations, the set of template images can be manually or automatically selected from a large corpus of images to provide a representative group of template images indicative of representative images for varying scenarios or features for the given topic. For example, a topic can be rooms, neighborhoods, faces, etc.

The systems and methods disclosed herein can be used to provide personalized advertisements to users. For example, the preferences for a user may be stored. The stored preferences can tailor the provided product advertisements to render the advertised product on the user's preferred template image.

In some implementations, the augmented reality assets can be managed, generated, and/or reproduced by product brands. The digitization parameters may be taken from third party companies. In some implementations, the digitization parameters may be extracted from a third party rendering engine or exported from a provided template for augmented reality rendering effect generation.

Moreover, the perception model can be manually or automatically adjusted to provide optimized meshes. The adjustments can be reactionary to lighting or varying image quality. The platform may provide previews to aid in modifying the augmented reality model. In some implementations, the platform may include a pipeline for retrieving images.

The prerendered images may include tagging to index the product rendered.

In some implementations, the indexed products may include a uniform naming procedure for products and product colors for better search results. The platform can include data structures that can correlate augmented reality assets with certain semantic or lexographic entities. The data structures may help understand search queries to create product mapping.

In some implementations, the prerendered images may be provided as a carousel for a user to scroll through. Alternatively, varying prerendered images with differing product renderings but the same template image may be provided in a carousel for personalized previews. Furthermore, in some implementations, the carousel may include a virtual "try-on" panel for providing the user with an augmented reality rendering experience that processes the user's data to provide a user augmented image or video.

In some implementations, the augmented reality platform may retrieve data assets for rendering augmented reality effects via systems and methods for data asset acquisition. The systems and methods for data asset acquisition can involve one or more systems or devices. The first computing device may be a server, a facilitating computing device, or an intermediary computing device. The second computing device may be a third party computing device. The third party can be a video game company, a product manufacturer, or a product brand. The first computing device and the second computing device can exchange data to generate an augmented reality rendering experience for users. The augmented reality rendering experience can include rendering an augmented reality view that includes one or more products or items. The product may be cosmetics (e.g., lipstick, eye shadow, etc.), furniture or other home goods (e.g., electronic equipment, cookware, glassware, decorations, plants, etc.), clothing, paint colors, automobiles, various electronics, or any other item.

The data asset acquisition can include the first computing device sending a software development kit to the second computing device. The software development kit can include a template for building rendering effect shaders. The software development kit can include example effects, tools to build a rendering effect, and a preview mode to help build an augmented reality rendering. The second computing device can be used to build the rendering effect, and once the rendering effect is built, the second computing device can export the built rendering effect data into a renderable compressed file (e.g., a .ZIP file), which can include data assets needed to recreate the rendering effect. The data assets can then be sent to the first computing device. The first computing device, upon receiving the data assets, can store the data assets for use in an augmented reality rendering experience provided to users. The provided augmented reality rendering experience can be provided to users, where users can input their user data for processing, and the output can be augmented user data that includes the rendering effect built on the second computing device. The user data can be image data or video data captured by a user device. In some implementations, the user data can be a live camera feed.

Moreover, in some implementations, the systems and methods may be used as a visual compatibility calculator. For example, the systems and methods can be used to ensure a certain product or part will fit in the desired space or location. The systems and methods can be used to virtually test-out the measurements/size of a product using virtual reality. The third party can provide data assets that can include data descriptive of the measurements of a product. The data assets can then be used to provide an augmented reality rendering experience to a user in which a product is rendered according to the measurements provided by the third party. This aspect can allow consumers to "try-on" products to visualize the space the product may take-up.

The systems and methods of the present disclosure provide a number of technical effects and benefits. As one example, the system and methods can generate a set of prerendered images using a set of template images and an augmented reality experience. The systems and methods can further be used to provide prerendered images of a product on varying templates for consumers. Furthermore, the systems and methods can enable the consumer to see a prerendered augmented reality rendering on a template meeting the consumer's preferences.

Another technical benefit of the systems and methods of the present disclosure is the ability to provide "try-on" images matching consumer preferences for shopping when an augmented reality real-time try-on experience is not ideal.

With reference now to the Figures, example embodiments of the present disclosure will be discussed in further detail.

Example Devices and Systems

FIG. 1A depicts a block diagram of an example computing system 100 that performs prerendering according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more augmented reality models 120, or augmented reality models. For example, the augmented reality models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example augmented reality rendering models 120 are discussed with reference to FIGS. 5-9.

In some implementations, the one or more augmented reality rendering models 120 can be received from the server computing system 130 over network 180, stored in the user computing device memory 114, and then used or otherwise implemented by the one or more processors 112. In some implementations, the user computing device 102 can implement multiple parallel instances of a single augmented reality rendering model 120.

More particularly, the augmented reality rendering model can utilize a perception model and a rendering model to render augmented reality renderings into template images. The perception model may be a model stored on the platform that is applicable with various rendering models. The rendering model may be generated by third parties using a software development kit. The rendering model may be sent to the platform after being built by the third party. In some implementations, the platform may receive data assets for the rendering model from the third party.

The template images may be processed by the augmented reality rendering model with the perception model generating meshes and segmentation masks based on the processing of the template image, and the rendering model may process the template image, meshes, and segmentation masks to generate a prerendered image.

Additionally or alternatively, one or more augmented reality rendering models 140 can be included in or otherwise stored and implemented by the server computing system 130 that communicates with the user computing device 102 according to a client-server relationship. For example, the augmented reality rendering models 140 can be implemented by the server computing system 140 as a portion of a web service (e.g., a prerendered try-on service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned augmented reality rendering models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 5-9.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the augmented reality models 120 and/or 140 based on a set of training data 162. The training data 162 can include, for example, shaders built by a third party with a software development kit, in which the third party received the software development kit from a facilitating computing device or the server computing system 130. The third party may have generated the shaders and the data assets by building and testing augmented reality experiences with the software development kit.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

In some implementations, the perception model and the rendering model of the augmented reality model may be trained using template images. The template images may be the images from the corpus of template images provided to users as prerendered images or, in some implementations, the training template images may be a different set of template images used for just training.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). In another example, the input includes visual data (e.g., one or more images or videos), the output comprises compressed visual data, and the task is a visual data compression task. In another example, the task may comprise generating an embedding for input data (e.g., visual data).

In some cases, the input includes visual data, and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
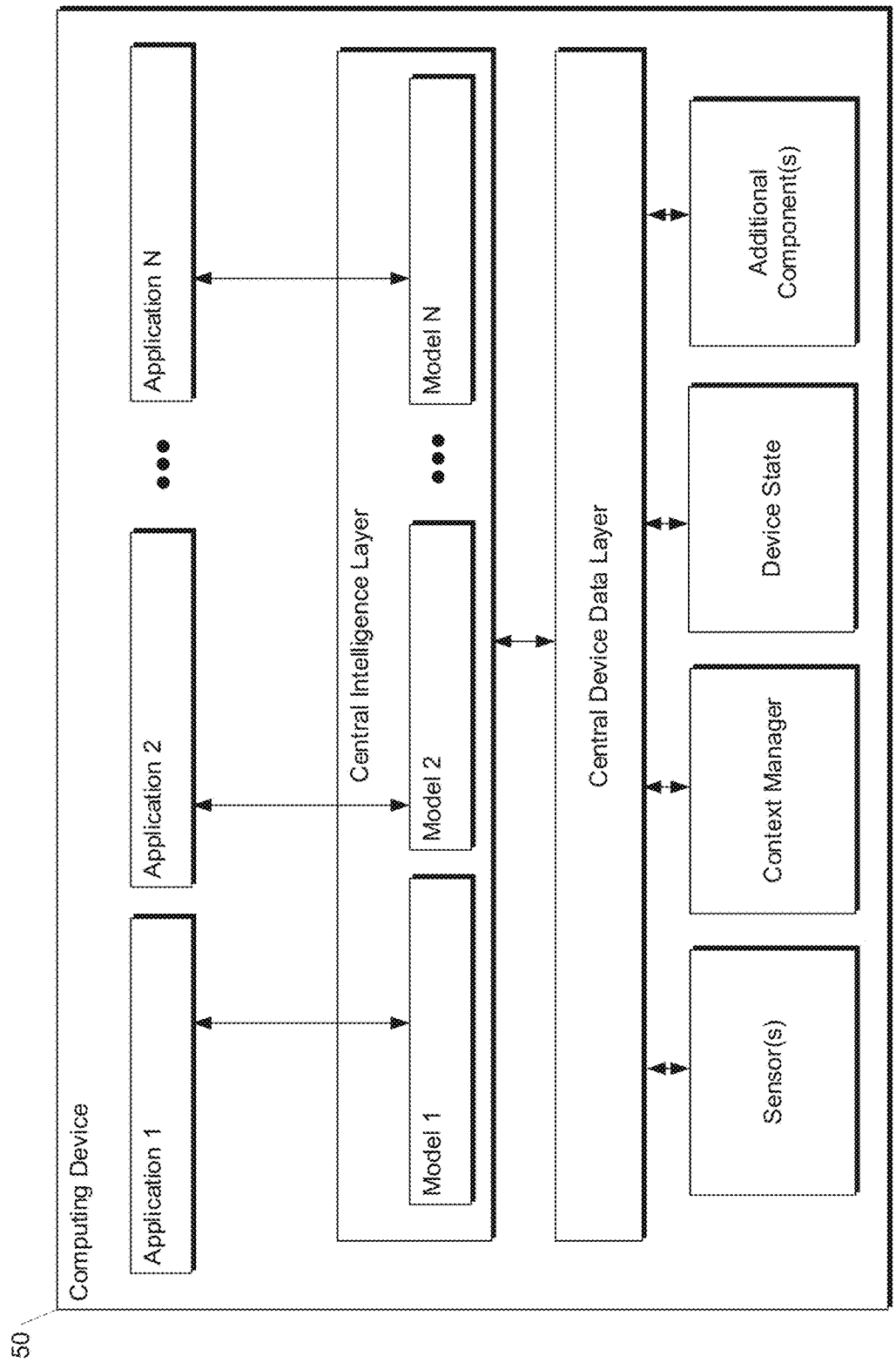
FIG. 1C depicts a block diagram of an example computing device that performs prerendering according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

FIG. 2 depicts a block diagram of an example implementation 200 according to example embodiments of the present disclosure. In some implementations, the example implementation 200 includes a list of search results 204 descriptive of results of a search query and, as a result of receipt of the list of search results 204, provides prerendered images 208 that are augmented reality prerendered images including renderings of the resulting products of one or more of the results 206, from the list of search results 204. Thus, in some implementations, the example implementation 200 can include a search query input area 202 that is operable to receive search query inputs.

The example implementation of FIG. 2 depicts a search engine web service 210. The search engine input area 202 can intake a search query that can include one or more search terms. The platform can intake and process the search query to provide a list of search results 204. The one or more search terms can relate to products for purchase. In these implementations, the list of search results 204 can be one or more products related to the search terms. In some implementations, one or more of the results 206, from the list of search results 204, can include one or more prerendered images 208 associated with the results 206. In some implementations, the prerendered images 208 can include a rendering of the corresponding results 206. In some implementations, a user can further select a virtual live try-on augmented reality experience.

Figure 3:
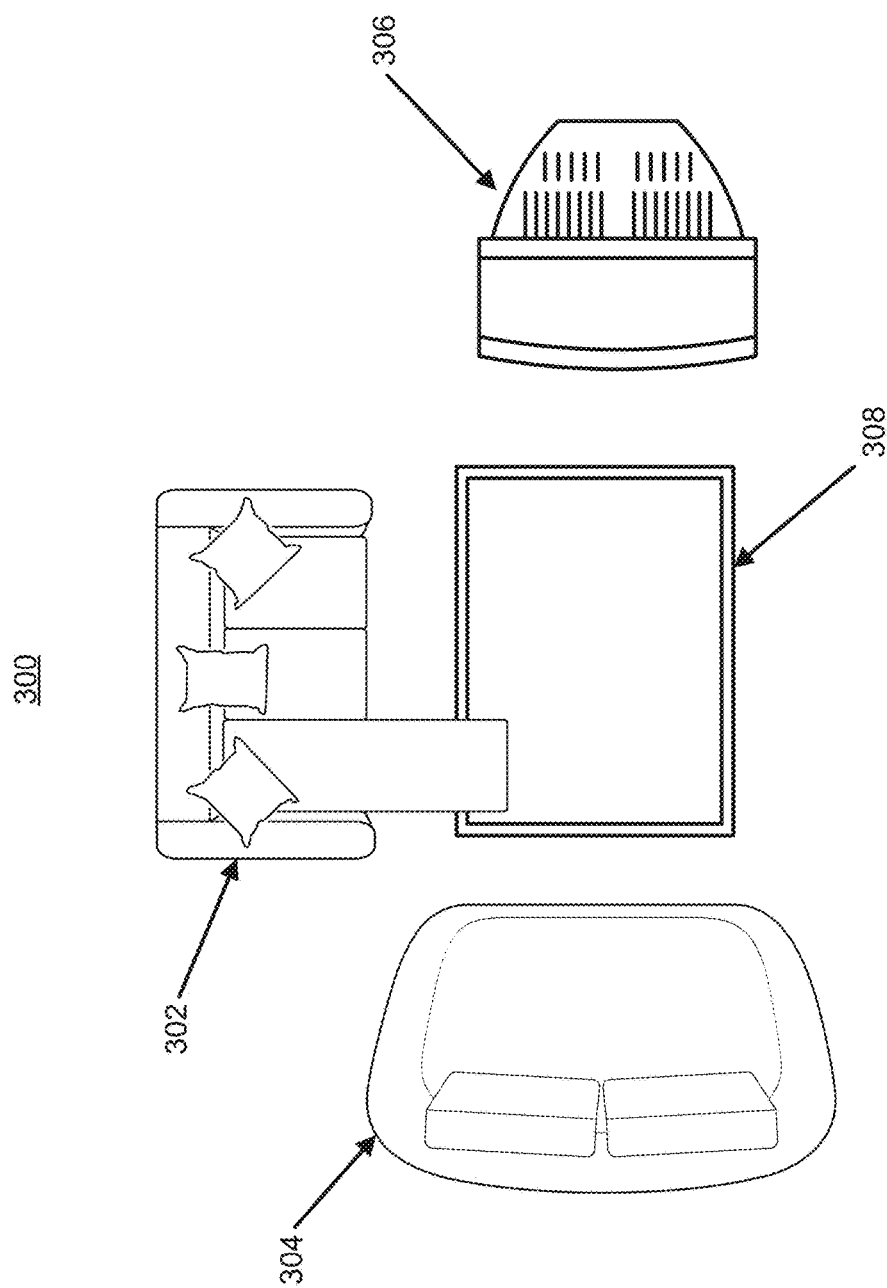
FIG. 3 depicts a block diagram of an example display of a prerendered image according to example embodiments of the present disclosure.

FIG. 3 depicts a block diagram of an example implementation 300 according to example embodiments of the present disclosure. The example implementation 300 is similar to example implementation 200 of FIG. 2 except that example implementation 300 further depicts an example result.

FIG. 3 depicts an example implementation 300 as a furniture try-on experience. For example, a product 302 can be rendered into a template environment to generate a prerendered image as shown in implementation 300. In this example, the loveseat 304, the television 306, and the rug 308 are part of a template image of an example room. The template image can be one of a plurality of template images that can be processed to generate a plurality of prerendered images. In this example the plurality of prerendered images may include a rendering of the product 302 in each of the respective template images. The template images can have varying sizes, themes, and configurations. For example, this example prerendered image includes the television 306 across from the loveseat 304 with a rug 308 in between. In some implementations, the platform may allow the user to view the rendered product in various locations in the template images.

Figure 4:
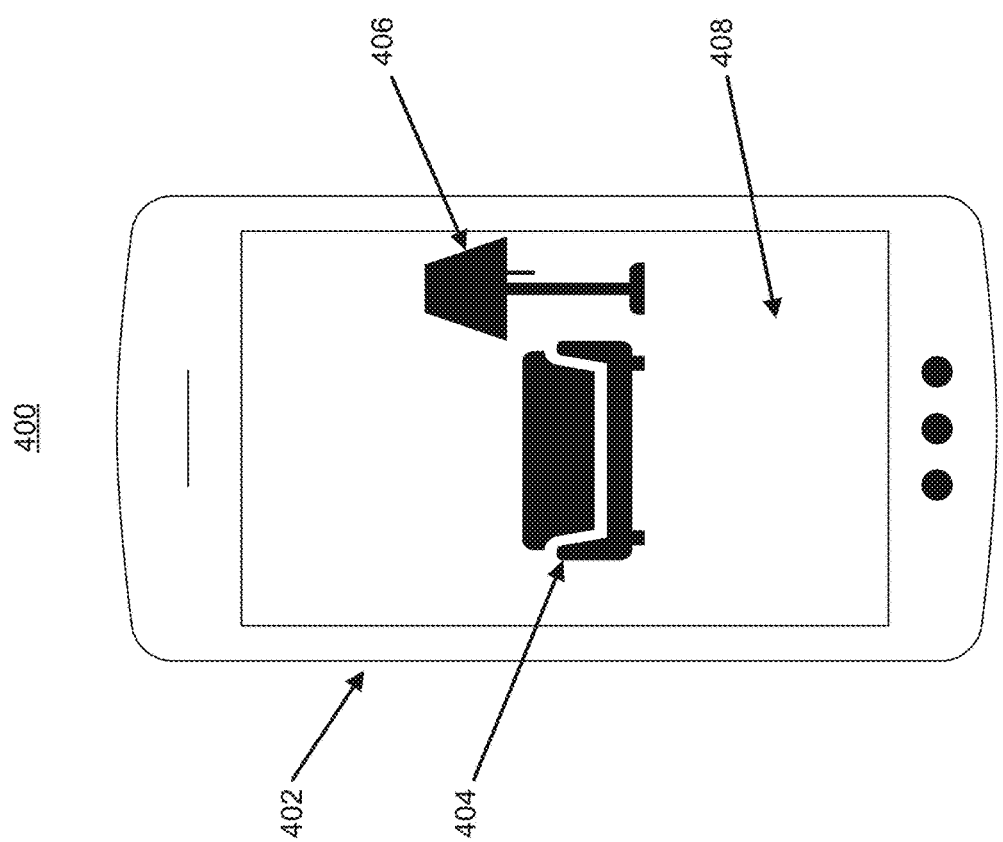
FIG. 4 depicts a block diagram of an example display of a prerendered image according to example embodiments of the present disclosure.

FIG. 4 depicts a block diagram of an example implementation 400 according to example embodiments of the present disclosure. The example implementation 400 is similar to example implementation 200 of FIG. 2 except that example implementation 400 further depicts an example implementation in a mobile application.

In the example implementation depicted in FIG. 4, the platform is accessed through a user interface in a mobile application on a mobile device 402. A user can use the mobile device to access the mobile application, where the user can store preferences and access the library of prerendered images. For example, the user may have a preference for a certain living room template image 408 that the user selected. The user may have selected that template image 408 as being the closest match to the user's living room. The template image 408 can include a similar couch 404 and a similar lamp 406 as found in the user's home. The template image 408, along with the other plurality of template images, may have been processed to generate a variety of prerendered images for various furniture and décor products. The platform with the help of the mobile application can provide a variety of décor or furniture products rendered into the user's preferred template image 408 to aid the user in their shopping experience. For example, the user may use the mobile application to see how a certain rug would look under a similar couch 404 and lamp 406 to the setup in their living room.

Figure 5:
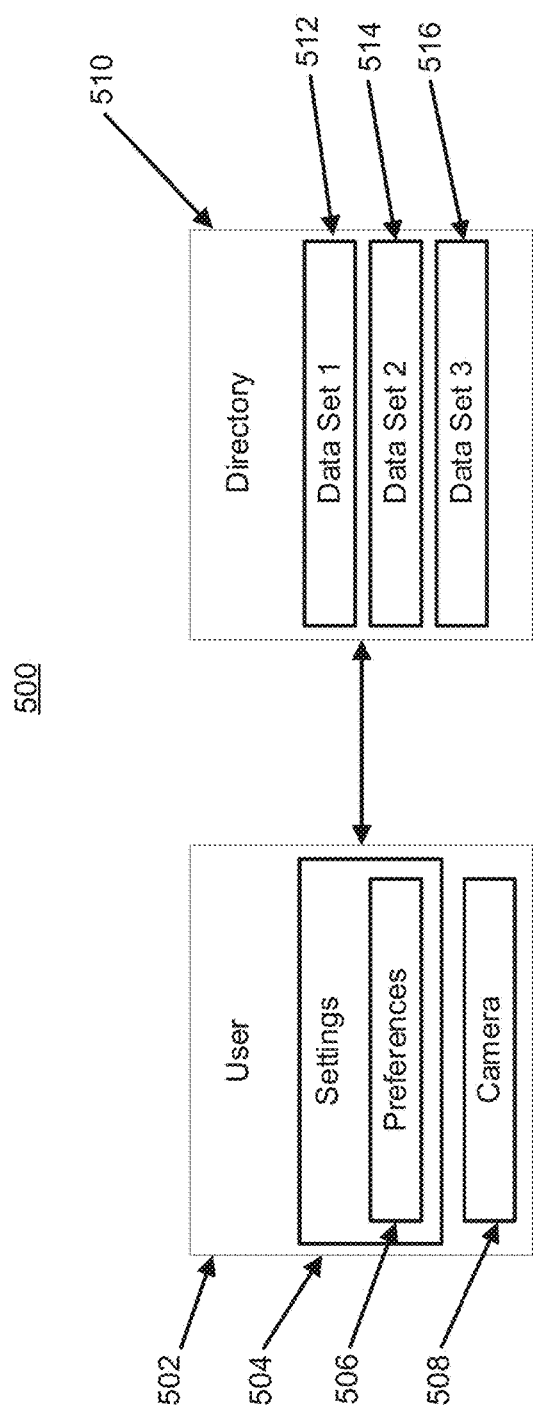
FIG. 5 depicts a block diagram of an example prerendering system according to example embodiments of the present disclosure.

FIG. 5 depicts a block diagram of an example platform 500 according to example embodiments of the present disclosure. In some implementations, the platform 500 is trained to receive a request and preferences 506 descriptive of user-specific preferences and, as a result of receipt of the preferences 506, provide output data that includes prerendered images of augmented reality renderings on template images related to the user-specific preferences 506. Thus, in some implementations, the platform 500 can include a directory 510 that is operable to store template images, augmented reality data assets, and prerendered images.

The example platform of FIG. 5 includes a directory 510 of prerendered images and a user 502. The user can have settings 504 selected by the user, which can include preferences 506. In some implementations, the preferences 506 can include selected preferences related to template images. The preferences 506 can be used to determine what prerendered image may be provided to the user from the plurality of prerendered images, when a request is made. For example, preferences related to a first template image can cause the platform to provide a prerendered image that includes a product rendered into the first template image.

The directory 510 can store template images, augmented reality assets, and prerendered images. The template images can be template images for a variety of environments including but not limited to rooms, yards, driveways, and faces. The augmented reality assets can be used to render a variety of objects and products including but not limited to furniture, décor, plants, electronics, automobiles, and make-up. In some implementations, the prerendered images can include products rendered into the template images, in which the products can be rendered based on the augmented reality assets.

In some implementations, the platform can store prerendered images for a variety of different products in a variety of environments. For example, data set 1 can include a variety of prerendered images of lamps in various living rooms 512. Data set 2 can include a plurality of prerendered images of lipstick on faces 514. Data set 3 can include a plurality of prerendered images of a tree in yards 516. In some implementations, the user can use a user interface provided by a web service, mobile application, or kiosk to access the prerendered images to aid in shopping.

Figure 9:
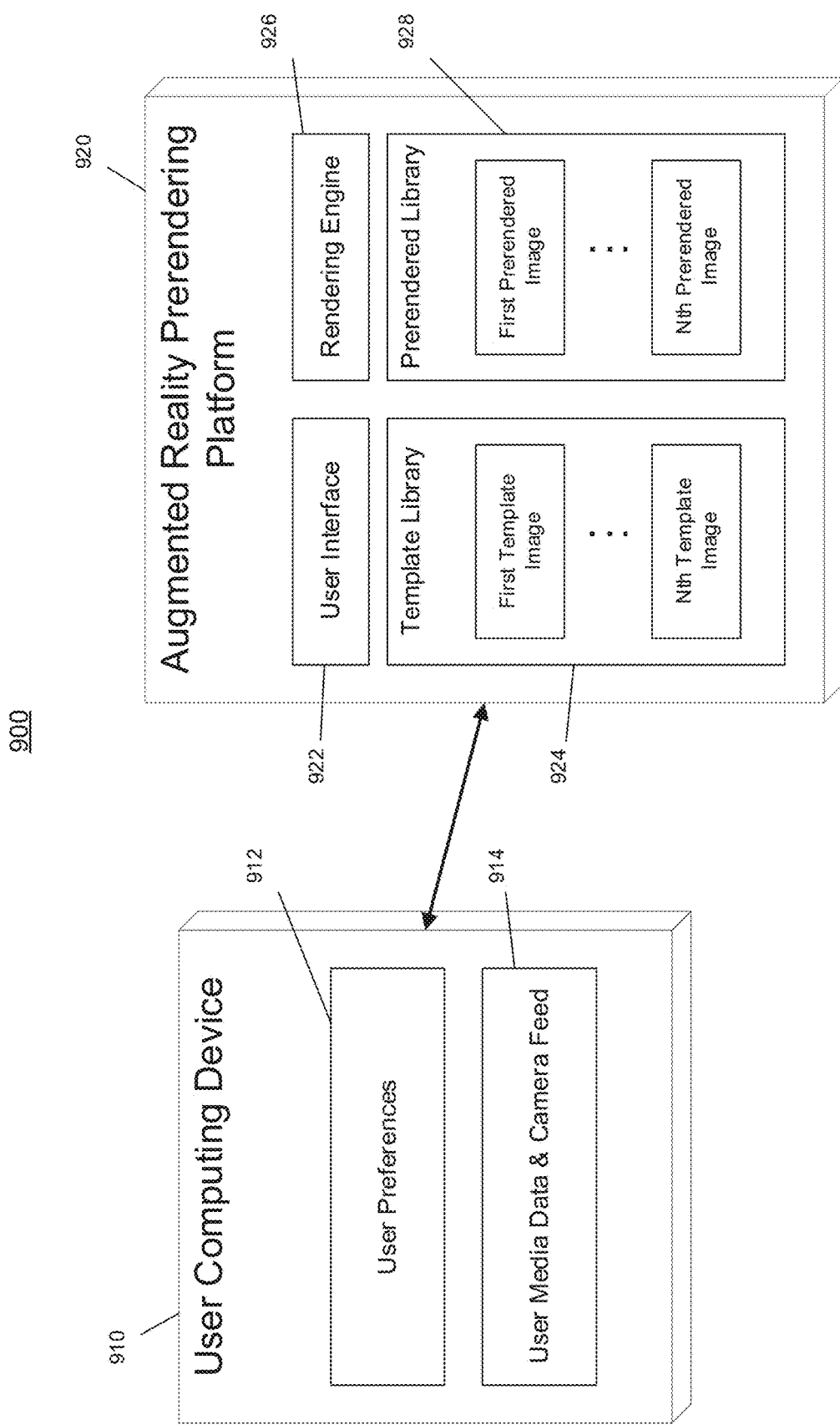
FIG. 9 depicts a block diagram of an example prerendering system according to example embodiments of the present disclosure.

FIG. 9 depicts a block diagram of an example augmentation platform 900 according to example embodiments of the present disclosure. In some implementations, the augmentation platform 900 is trained to receive a set of input data descriptive of a user request and, as a result of receipt of the input data, provide output data that includes a prerendered rendering in a template image. Thus, in some implementations, the augmentation platform 900 can include an augmented reality prerendering platform 920 that is operable to interact with a user device and enable an augmented reality prerendering experience.

The augmented reality prerendering platform 920 depicted in FIG. 9 includes a user interface 922 to allow for user interaction, a template library 924 for processing, a rendering engine 926 to process the template images, and a prerendered library 928 that stores the prerendered images generated by processing the template images.

In some implementations, the augmented reality prerendering platform 920 can receive user preferences 912 from a user computing device 910. The user preferences 912 can be used to determine which of a plurality of prerendered images is provided to the user computing device 910 from the prerendered library 928.

In some implementations, the augmented reality prerendering platform 920 can provide an option for an augmented reality live try-on experience. The experience can involve the processing of user media data or user camera feed 914 by the rendering engine 926 to generate a rendering in the user's provided data.

Example Methods

Figure 6:
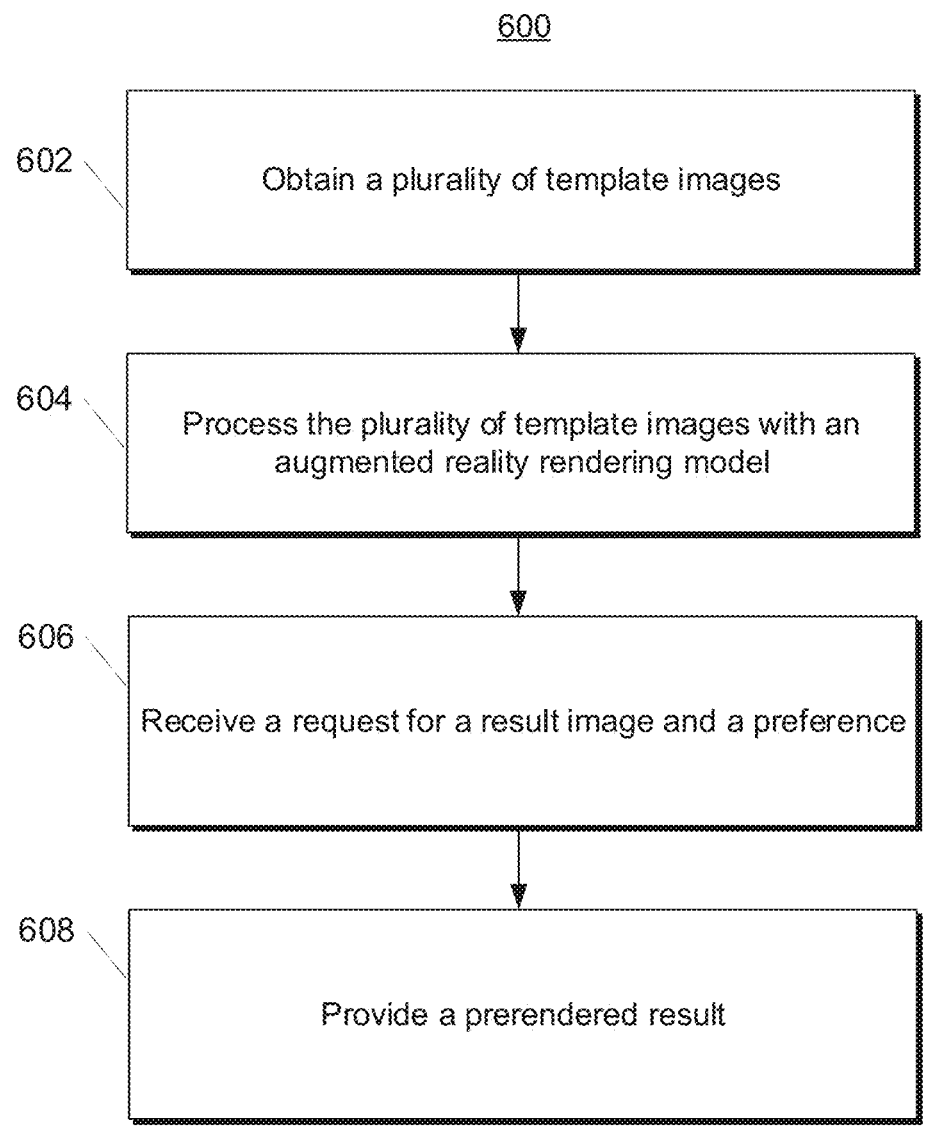
FIG. 6 depicts a flow chart diagram of an example method to perform prerendering according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain a plurality of template images. In some implementations, the template images can include room images, face images, or yard images. The plurality of template images can include images of varying environments. For example, the plurality of template images can include a variety of different room sizes, configurations, themes, lighting, or colors.

At 604, the computing system can process the plurality of template images with an augmented reality rendering model. The augmented reality rendering model can include object tracking and rendering. The processing of the template images with the augmented reality rendering model can generate a plurality of prerendered images. The plurality of prerendered images can include an augmented reality rendering rendered inside each of the plurality of template images. The augmented reality rendering can be descriptive of a product. The augmented reality rendering model can be based at least in part on data assets provided by a third party in which the data assets are generated by the third party by building an augmented reality rendering experience that renders the product in images and videos. For example, the product being rendered can be furniture (e.g., a couch, a chair, a table, etc.). The plurality of prerendered images can include a particular couch rendered into a plurality of different template images depicting a variety of different rooms with different sizes, colors, themes, and configurations. In another example, the product can be a make-up product (e.g., lipstick, mascara, foundation, eyeliner, eyeshadow, etc.). In this implementation, the plurality of prerendered images can include a rendering of a make-up product, such as lipstick. In this implementation, the lipstick can be rendered on the plurality of template face images.

In some implementations, the processing with the augmented reality rendering model can include processing the plurality of template images with a perception model to generate meshes and segmentation masks, and then processing the meshes, segmentation masks, and template images with a rendering model to generate the plurality of prerendered images.

At 606, the computing system can receive a request for a result image and a preference. The request can include search terms input into a search engine. In some implementations, the preference can include a pre-selected template.

At 608, the computing system can provide a prerendered result. The prerendered result can be based at least in part on the request and the preference. The prerendered result can be a prerendered image from the plurality of prerendered images. In some implementations, the prerendered result can be a prerendered image matching the preference, in which the preference can include a template selected by a user from the plurality of template images.

In some implementations, the computer system can provide an augmented reality experience. The augmented reality experience can be provided when receiving a selection to go to the augmented reality experience.

Figure 7:
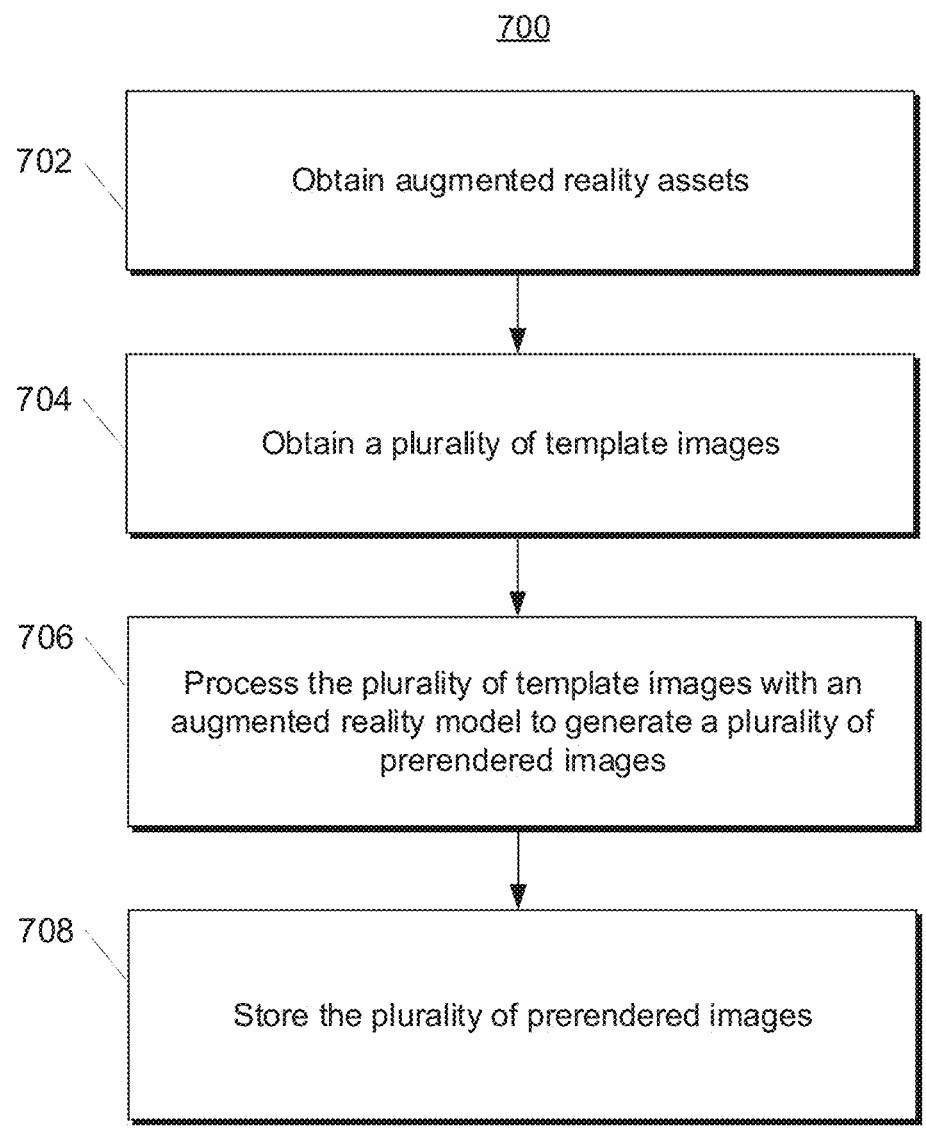
FIG. 7 depicts a flow chart diagram of an example method to perform prerendering according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain augmented reality assets. The augmented reality assets can include digitization parameters.

At 704, the computing system can obtain a plurality of template images.

At 706, the computing system can process the plurality of template images with an augmented reality model to generate a plurality of prerendered images. The plurality of prerendered images can be generated based at least in part on the digitization parameters. In some implementations, the computer system can generate a plurality of template models based at least in part on the plurality of template images. The augmented reality model can then process the plurality of template models to generate the plurality of prerendered images.

In some implementations, the computing system can include receiving an input to modify a template model of the plurality of template models. The template model can be modified based at least in part on the template. In some implementations, the template models can be provided for display.

At 708, the computing system can store the plurality of prerendered images. In some implementations, the plurality of prerendered images can be stored on a server.

The computing system can provide a stored prerendered image to a user. In some implementations, the computing system can receive a search query including one or more search terms, in which the one or more search terms relate to a product. The computing system can then provide a search result, in which the search result includes a prerendered image from the plurality of prerendered images. In some implementations, the prerendered image can include a rendering of the product.

In some implementations, the computing system may provide a link to a real-time augmented reality experience.

Figure 8:
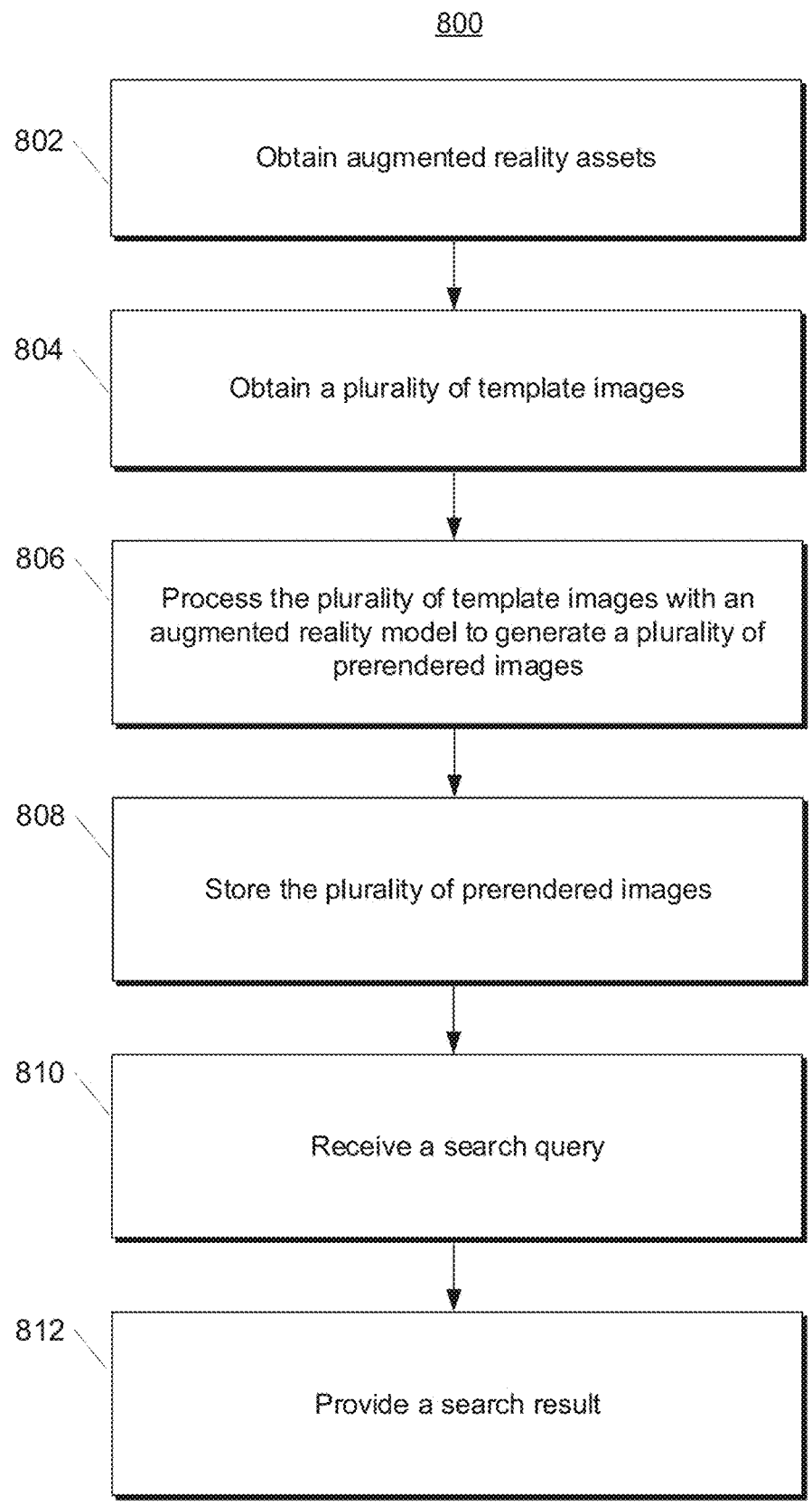
FIG. 8 depicts a flow chart diagram of an example method to perform prerendering according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain augmented reality assets. The augmented reality assets can include digitization parameters.

At 804, the computing system can obtain a plurality of template images.

At 806, the computing system can process the plurality of template images with an augmented reality model to generate a plurality of prerendered images. The augmented reality model can generate the plurality of prerendered images based at least in part on the digitization parameters.

At 808, the computing system can store the plurality of prerendered images.

At 810, the computing system can receive a search query. The search query can include one or more search terms, in which the one or more search terms relate to a product.

At 812, the computing system can provide a search result. The search result can include a prerendered image from the plurality of prerendered images retrieved from the server, in which the prerendered image can include a rendering of the product.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for providing prerendered augmented images, the method comprising:
   obtaining, by a computing device, a plurality of template images;
   processing, by the computing device, the plurality of template images with an augmented reality rendering model to generate a plurality of prerendered images;
   receiving, by the computing device, a request for a result image and a preference; and
   providing, by the computing device, a prerendered result based at least in part on the request and the preference, wherein the prerendered result is a prerendered image from the plurality of prerendered images.

2. The computer-implemented method of claim 1, wherein the plurality of template images comprise a plurality of room images.

3. The computer-implemented method of claim 1, wherein the plurality of prerendered images comprise a plurality of rendered furniture images.

4. The computer-implemented method of claim 1, wherein the plurality of template images comprise a plurality of face images.

5. The computer-implemented method of claim 1, wherein the plurality of prerendered images comprise a plurality of rendered make-up images.

6. The computer-implemented method of claim 1, wherein the augmented reality rendering model comprises a perception model and a rendering model.

7. The computer-implemented method of claim 1, wherein the request comprises search terms input into a search engine.

8. The computer-implemented method of claim 1, wherein the preference comprises a pre-selected template.

9. The computer-implemented method of claim 1, wherein the prerendered result is a particular prerendered image matching the preference, wherein the preference comprises a template selected by a user from the plurality of template images.

10. The computer-implemented method of claim 1, further comprising: providing, by the computing device, an augmented reality rendering experience.

11. A computing system comprising:
one or more processors;
one or more non-transitory computer readable media that collectively store instructions that, when executed by the one or more processors, cause the computing system to perform operations, the operations comprising:
obtaining augmented reality assets, wherein the augmented reality assets comprise digitization parameters;
obtaining a plurality of template images;
processing the plurality of template images with an augmented reality model to generate a plurality of prerendered images based at least in part on the digitization parameters;
storing the plurality of prerendered images;
receiving a request for a result image and a preference; and
providing a prerendered result based at least in part on the request and the preference, wherein the prerendered result is a prerendered image from the plurality of prerendered images.

12. The computing system of claim 11, further comprising: generating a plurality of template models based at least in part on the plurality of template images, wherein the augmented reality model processes the plurality of template models.

13. The computing system of claim 12, further comprising:
receiving an input to modify a template model of the plurality of template models; and
modifying the template model based at least in part on the input.

14. The computing system of claim 12, further comprising: providing a template model of the plurality of template models for display.

15. The computing system of claim 11, wherein storing the plurality of prerendered images comprises storing the plurality of prerendered images on a server.

16. The computing system of claim 10, further comprising: providing a link to a real-time augmented reality experience.

17. The computing system of claim 11, further comprising:
receiving a search query comprising one or more search terms, wherein the one or more search terms relate to a product; and
providing a search result, wherein the search result comprises the prerendered image from the plurality of prerendered images, wherein the prerendered image comprises a rendering of the product.

18. The computing system of claim 11, wherein the augmented reality assets comprise data descriptive of a product.

19. One or more non-transitory computer readable media that collectively store instructions that, when executed by one or more processors, cause a computing system to perform operations, the operations comprising:
obtaining augmented reality assets, wherein the augmented reality assets comprise digitization parameters;
obtaining a plurality of template images;
processing the plurality of template images with an augmented reality model to generate a plurality of prerendered images based at least in part on the digitization parameters;
storing the plurality of prerendered images on a server;
receiving a search query comprising one or more search terms, wherein the one or more search terms relate to a product; and
providing a search result, wherein the search result comprises a prerendered image from the plurality of prerendered images retrieved from the server, wherein the prerendered image comprises a rendering of the product.

* * * * *